United States Patent [19]

Mulcahy et al.

[11] Patent Number: 5,601,679

[45] Date of Patent: Feb. 11, 1997

[54] THERMOFORMED COMPOSITE ARTICLE OF MANUFACTURE AND PROCESS FOR PRODUCING SAID ARTICLE

[75] Inventors: Charles M. Mulcahy, Clarksburg, Mass.; Kurt A. Weiss, Stephentown, N.Y.

[73] Assignee: General Electric Company, Pittsfield, Mass.

[21] Appl. No.: 226,148

[22] Filed: Apr. 11, 1994

[51] Int. Cl.$^6$ .............................. B29C 47/00; B28B 5/00
[52] U.S. Cl. ..................... 156/242; 156/243; 156/245; 156/290; 156/292; 264/167; 264/241; 264/250; 264/510; 428/172; 428/178
[58] Field of Search .................... 428/131, 137, 428/156, 172, 138, 141, 178; 156/242, 190, 243, 245, 250, 292; 264/250, 510, 167, 171, 173, 241

[56] References Cited

U.S. PATENT DOCUMENTS

| | | | |
|---|---|---|---|
| 1,278,270 | 9/1918 | Wilber | 428/47 |
| 4,150,186 | 4/1979 | Kazama | 428/140 |
| 4,313,984 | 2/1982 | Moraw et al. | 428/138 |
| 4,489,119 | 12/1984 | Ishiye et al. | 428/138 |
| 4,801,483 | 1/1989 | Beckerman et al. | 428/71 |
| 4,812,349 | 3/1989 | Muelbeck | 428/138 |
| 5,049,431 | 9/1991 | Heckel et al. | 428/138 |
| 5,198,278 | 3/1993 | Sumimoto et al. | 428/95 |

OTHER PUBLICATIONS

Section 4, Application, Fabrication, and Installation from Decorative Laminates Article.

Recommended Application, Fabrication & Assembly, Technical Data, etc. from Formica Colorcore Brochure.

*Primary Examiner*—Donald Loney

[57] ABSTRACT

The present invention relates to a novel method of manufacturing a composite article of manufacture such as an integrated sink/counter combination from a single sheet of solid surfacing material and a single substrate material. The present invention also relates to a thermoformed composite article of manufacture produced from such a process. The novel method comprises adhering the coating material and substrate material and then thermoforming the coating material through an opening in the substrate material. Preferably, the coating material is a thermoplastic resin composition and the substrate material is a non-thermoplastic material.

16 Claims, No Drawings

THERMOFORMED COMPOSITE ARTICLE OF MANUFACTURE AND PROCESS FOR PRODUCING SAID ARTICLE

FIELD OF THE INVENTION

The present invention is directed to a method for thermoforming a composite article of manufacture such as an integrated counter/sink assembly.

BACKGROUND OF THE INVENTION

There are a number of ways to mold or shape plastic or plastic-like materials. For example, it is known to use injection molding, vacuum molding, extrusion, etc. However, the vast majority of these molding operations must or have traditionally been performed on plastic or plastic-like material prior to assembly of the plastic parts into the final article of manufacture. Thus, in many cases once the plastic part has been combined with the other components, it is necessary to perform various secondary operations such as finishing, sanding, adhering, cutting, shaping, etc.

For example, when the article is a bathroom vanity or kitchen counter/sink combination, the counter portion is formed separately from adhering (i) a counter top material such as a Formica® laminate or thermoset plastic onto (ii) a wood-based substrate material. Next, a hole is cut in the counter and then a sink which has been separately manufactured via, e.g., injection molding, is mounted into or on top of the counter.

However, there are numerous disadvantages to manufacturing and installing articles in separate pieces. For example, with regard to the above counter/sink arrangement, there are significantly more steps that need to be performed in order to assemble the separately manufactured parts into a single article of manufacture. That is, one must (i) mold and assemble the counter, (ii) mold the sink, (iii) assemble the sink to the counter, (iv) reinforce the sink/counter combination if necessary, and finally (v) perform all necessary finishing operations. Additionally, there are potential structural defects at each of the joints or seams where the individual pieces are attached or connected. There are also appearance issues when multiple pieces are adhered or connected together. For example, it is desirable for a counter/sink combination to have a virtually seamless appearance. This visual appearance is difficult if not impossible to achieve when individual pieces are to be connected to one another. Moreover, there are issues over time with the adhesive material yellowing and thereby creating appearance issues.

Accordingly, it is an object of the present invention to eliminate the multiple operations, possible structural defects and appearance issues associated with the prior art methods of fabrication by preparing an article of manufacture from a single coating material and a single substrate material by thermoforming the coating material through an opening in the substrate material.

SUMMARY OF THE INVENTION

The present invention provides a method for thermoforming a composite article of manufacture, comprising the steps of adhering a thermoformable coating material to a substrate material, and thermoforming the coating material into a predetermined shape through a hole in the substrate material. The present invention also provides a thermoformed composite article manufactured by the above method.

DETAILED DESCRIPTION OF THE INVENTION

Thermoforming is a process well known in the art for manufacturing products from, e.g., thermoplastic sheet which is heated to its softening point, formed by low pressure into a mold, cooled, and then trimmed from the sheet. All thermoplastic materials or the like that can be processed into sheet can be thermoformed, provided that the heated area to be formed does not exceed the hot strength capabilities of the material to support itself.

The present method of thermoforming is unique in that it relates to the-thermoforming of a coating material such as a thermoplastic material through a preformed opening in a second, non-thermoplastic material, e.g., a substrate material, which has been previously attached to the coating material. This is in contrast to the prior art methods of thermoforming wherein the thermoplastic material was first thermoformed by itself and then it was attached to the second, non-thermoplastic material.

The coating material according to the present invention is virtually any material which can be thermoformed. Thus, the preferred materials are thermoplastic materials such as the following polymers, copolymers and/or blends where appropriate: polyesters, polycarbonates, polyetherimides, polyamides, polyester carbonates, polyphenylene sulfide, polyamideimides, polyarylates, polymethylpentenes, polysulfones, polyethersulfones, polystyrenes, rubber modified high impact polystyrenes, acetals, styrene acrylonitriles, styrene maleic anhydride (SMA), acrylonitrile styrene acrylate (ASA), modified polyphenylene ethers, polyether ketones, acrylonitrile butadiene styrene (ABS), chlorinated polymers such as polyvinyl chloride, fluorinated polymers such as perfluoroalkoxy (PFA), poly(ethylene-chlorotrifluoroethylene) (E-CTFE), poly(ethylene-tetrafluoroethylene) (E-TFE), polyvinylidene fluoride (PVDF), fluorinated ethylene-proplyene (FEP), etc., as well as liquid crystal polymers.

The present invention is particularly well suited for thermoplastic materials which can provide a ceramic-like look and feel and/or materials which are suitable for use as solid surfacing materials such as highly filled crystalline polyesters and their blends. Polyesters suitable for preparing the present compositions include those comprising structural units of the formula (I)

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (I) are poly(alkylene dicarboxylates), elastomeric polyesters, liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (I) is most often p- or m-phenylene or a mixture thereof. As previously noted, this class of polyester includes the poly(alkylene terephthalates) and the polyarylates. Such polyesters are known in the art as illustrated by the following patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

The poly(alkylene terephthalates) are often the preferred polyesters for the present invention, with poly-(ethylene terephthalate) (PET), poly-(cyclohexylene terephthalate) (PCT), and poly (butylene terephthalate) (PBT) being the most preferred members of this class. Various mixtures of PET, PCT and PBT are also sometimes very suitable.

The polyester may include structural units of the formula (II)

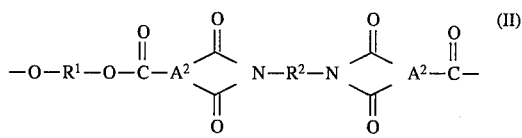

wherein $R^1$ is as previously defined. $R^2$ is a polyoxyalkylene radical and $A^2$ is a trivalent aromatic radical, usually derived from trimellitic acid and has the structure (III)

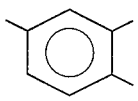

Such polymers and their mode of preparation are described, for example, in U.S. Pat. No. 4,544,734; 4,556,705; and 4,556,688, which are incorporated herein by reference.

The amount of the polyester according to the present invention varies with the properties which are required by the given application but preferably the total amount of polyester ranges from about 0–70 percent by weight and more preferably from about 5 to 50 percent by weight and most preferably from about 10 to 30 percent by weight.

Polycarbonate resins are particularly well suited for blending with the above polyesters when a solid surfacing-type material is desired. Polycarbonate resins are, of themselves, well known compounds which are described along with methods for their preparation in U.S. Pat. Nos. 3,989,672; 3,275,601 and 3,028,365, all of which are incorporated herein by reference.

They may be conveniently prepared by the reaction of at least one dihydric phenol and a carbonate precursor. The dihydric phenols employed in the practice of this invention are known dihydric phenols which may be represented by the general formula:

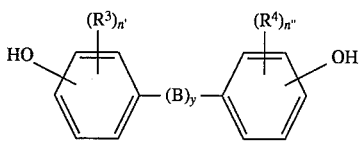

wherein:

$R^3$ is independently selected from halogen, monovalent hydrocarbon, and monovalent hydrocarbonoxy radicals;

$R^4$ is independently selected from halogen, monovalent hydrocarbon, and monovalent hydrocarbonoxy radicals;

B is selected from divalent hydrocarbon radicals,

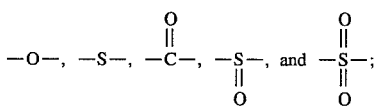

n' and n" are independently selected from integers having a value of from 0 to 4 inclusive; and y is either zero or one.

The monovalent hydrocarbon radicals represented by $R^3$ and $R^4$ include the alkyl, cycloalkyl, aryl, aralkyl, and alkaryl radicals.

The preferred alkyl radicals are those containing from 1 to about 12 carbon atoms. The preferred cycloalkyl radicals are those containing from 4 to about 12 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms. The preferred halogen radicals represented by $R^3$ and $R^4$ are chlorine and bromine.

The monovalent hydrocarbonoxy radicals may be represented by the general formula —$OR^5$ wherein $R^5$ has the same meaning as $R^3$ and $R^4$. The preferred hydrocarbonoxy radicals are the alkoxy and the aryloxy radicals.

The divalent hydrocarbon radicals represented by B include the alkylene, alkylidene, cycloalkylene, and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The polycarbonates of the instant invention contain at least one recurring structural unit represented by the formula:

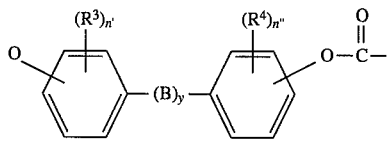

wherein:

B, $R^3$, $R^4$, n', n" and y are as defined above. Monofunctional phenols can be added as end capping agents to the polymerization to control molecular weight and provide desired properties. The term "polycarbonate" according to the invention also contemplates resins such as polyarylates, polyestercarbonates or the like.

The amount of the polycarbonate resin in the composition is preferably between about 0 and about 35 weight percent, and more preferably between about 5 and 25 weight percent, and most preferably between about 10 an 20 weight percent of the thermoplastic composition.

In the practice of the present invention, it may be desirable to add an impact modifier. Although the specific type of impact modifier is not critical, it is preferred to use an impact modifier which is based on a high molecular weight styrenediene rubber.

A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, polyisoprene, radial teleblock copolymer of styrene and a Y conjugated diene, acrylic resin modified styrene-butadiene resins and the like; and graft copolymers obtained by graft-copolymerization of a monomer or monomer mix containing a styrenic compound as the main component to a rubber-like polymer. The rubber-like polymer used in the graft copolymer are as already described herein including polybutadiene, styrene-butadiene copolymer, acrylonitrile-butadiene copolymer, ethylene-propylene copolymer, ethylene butylene copolymer, polyacrylate and the like. The styrenic compounds includes styrene, methylstyrene, dimethylstyrene, isopropylstyrene, α-methylstyrene, ethylvinyltoluene and the like.

Procedures for the preparation of these polymers are found in U.S. Pat. Nos. 4,196,116; 3,299,174 and 3,333,024, all of which are incorporated by reference.

The present invention also contemplates the incorporation into the preferred polyester composition of a thermoplastic multi-block copolymer elastomer such as copolyetheresters and copolyetherimide esters. Certain types of these copolymers are described in U.S. Pat. Nos. 4,988,740; 4,544,734; 4,556,688 and 4,579,884 all of which are incorporated by reference.

It is further preferred to employ an inorganic filler to the thermoplastic resin to impart a series of additional beneficial properties, not the least of which are thermal stability, increased density, and texture. Inorganic fillers are well known in the art and most inorganic fillers known in the art which provide a ceramic-like feel can be used in the present invention.

Typical inorganic fillers which are employed in thermoplastic resins in general, and polyesters in specific, include: zinc oxide, barium sulfate, zirconium oxide, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins, glass microspheres, wollastonite, titanium dioxide, ground quartz as well as mixtures of the above. A few of the more preferred fillers include zinc oxide, barium sulfate, zirconium silicate, strontium sulfate, titanium dioxide, glass microspheres and mixtures of the above, with barium sulfate being the most preferred. The preferred form of barium sulfate will have a particle size of 0.1–20 microns. The barium sulfate may be derived from a natural or a synthetic source.

The molding compositions may include from 20%–85% by weight, preferably 30%–75% by weight or most preferably 30%–45% by weight of total composition of an inorganic filler component. For certain applications where a ceramic like product is desired, more than 50%, or more preferably 60%–85% by weight of the total composition of filler component should be employed.

The thermoplastic resin composition may also include other additives which are well known in the art. For example, the resin composition may contain external lubricants, antioxidants, flame retardants or the like. If desired, ultraviolet stabilizers, flow aids, metal additives for electromagnetic radiation shielding such as nickel coated graphite fibers, anti static agents, coupling agents such as amino silanes and the like may also be added.

In the thermoplastic compositions which contain a polyester and a polycarbonate resin, it is preferable to use a stabilizer material. Typically, such stabilizers are used at a level of 0.01–10 weight percent and preferably at a level of from 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability of a particular compound for use as a stabilizer and the determination of how much is to be used as a stabilizer may be readily determined by preparing a mixture of the polyester component, the polycarbonate and the filler with and without the particular compound and determining the effect on melt viscosity or color stability or the formation of interpolymer. The acidic phosphate salts include sodium dihydrogen phosphate, mono zinc phosphate, potassium hydrogen phosphate, calcium hydrogen phosphate and the like. The phosphites may be of the formula:

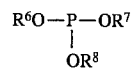

where $R^6$, $R^7$ and $R^8$ are independently selected from the group consisting of hydrogen, alkyl and aryl with the proviso that at least one of $R^6$, $R^7$ and $R^8$ is hydrogen or alkyl.

The phosphate salts of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates of the formula:

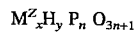

wherein M is a metal, x is a number ranging from 1 to 12 and y is a number ranging 1 to 12, n is a number from 2 to 10, z is a number from 1 to 5 and the sum of (xz)+y is equal to n+2.

These compounds include $Na_3HP_2O_7$; $K_2H_2P_2O_7$; $Na_4P_2O_7$; $KNaH_2P_2O_7$ and $Na_2H_2P_2O_7$. The particle size of the polyacid pyrophosphate should be less than 75 microns, preferably less than 50 microns and most preferably less than 20 microns.

In keeping with the present invention and since most of the thermoformed coating materials are thermoplastic resins, it is preferred that the substrate material comprise a non-thermoplastic based material. The present invention also allows for the use of a wide range of non-thermoplastic substrate materials, i.e., most of the non-thermoplastic substrate materials known in the art can be acceptable to the present invention.

In a preferred embodiment of the invention, the non-thermoplastic substrate is comprised of cellulose based materials. Within the range of cellulose based substrates, particleboard, fiberboard, solid lumber, chip board and plywood are the more preferred. However, these materials are not critical. Rather, these materials are preferred primarily because of their wide acceptance and availability throughout the industry, as well as their relatively low cost. Thus, given the proper acceptance within the industry, it would be possible to employ other materials such as thermoset resins or plastic board.

This invention is also applicable to an article of manufacture wherein the substrate and coating materials have significantly different expansion properties. The term "expansion properties" is intended to include expansion or contraction of the substrate and/or coating material from whatever source. The term "significantly different expansion properties" is intended to include a combination of materials with substantially different thermal coefficients of expansion or substantially different expansion due to moisture, etc. The most common sources of expansion are temperature and moisture, with expansion due to temperature being measured by the coefficient of thermal expansion.

For example, using the coefficient of thermal expansion as one measure of expansion properties, the present invention is capable of accommodating differences in coefficient of thermal expansion on the order of at least 300%. That is, the coating material may have a coefficient of thermal expansion which is three (3) times that of the substrate material, or vice versa. It should be noted, however, that this degree of difference is equally applicable for expansion due to sources other than temperature, e.g., moisture, etc. In a preferred embodiment of the invention, the difference in expansion properties between the substrate and coating can be at least 500%. In a more preferred embodiment of the invention, the difference in expansion properties between the substrate and coating can be at least 750%, and most preferably, at least 1000%.

The preferred applications for the coatings and substrates according to the invention include those areas in which laminate materials and wood based substrates have predominated. These areas include composite articles of manufacture such as counters, integrated sinks, desks, shower surrounds and other bathroom accessories, furniture, doors, appliance fascias, cabinets, work surfaces, profile edging, tile walls and chemical resistant lab tops, with the most preferred application being integrated sink/counter combinations.

In the method of the present invention, it is contemplated that the substrate and coating materials are adhered together. As indicated above, when the application is a counter/sink combination or the like, it is preferred that a thermoplastic material is adhered to a non-thermoplastic substrate. Typically, a laminating adhesive is best suited for adhering these two types of materials together, particularly when the two material will be subjected to a thermoforming process which could very well volatilize other types of adhesives such as rigid adhesives that may have lower boiling or sublimation temperatures.

The laminating adhesive is designed to permit the coating to "float" on the substrate, i.e., the laminating adhesive should provide some give between the coating and the substrate. Thus, the laminating adhesive is more flexible or elastic than, e.g., a rigid adhesive.

In a preferred embodiment of the present invention, the laminating adhesive comprises at least one of the following: rubber based contact cements, urea-formaldehyde adhesives, resorcinol adhesives, phenol-resorcinol adhesives, casein adhesives, NBR or SBR based adhesives.

The amount of the laminating adhesive is not critical. Rather, the laminating adhesive is used in an amount sufficient to adhere the coating material to the substrate material. Typically, a thin coating of adhesive is applied to either the back of the coating material or to the front surface of the substrate material, or both.

The process of the present process begins by selecting suitable substrate and coating materials according to the end-use application. It is important to note that while the present process is suitable for virtually any combination of substrate and thermoforming coating material, it finds the most utility when the coating material is a thermoplastic material and the substrate material is a non-thermoplastic material. This typically means that the substrate and coating materials will have significantly different expansion properties.

After selecting the appropriate substrate and coating materials, according to the desired end application, a hole is cut in the substrate material at the point where the thermoplastic material is to be thermoformed. This hole can be virtually any size suitable for thermoforming and can take a number of different shapes. It is also contemplated that the hole is not necessarily a hole, but rather any section cut away from the substrate material such as on the side of the substrate. For the preferred counter/sink combination, an round or slightly oval shape opening is cut into the substrate material the size of a sink.

Next, one or both of the substrate and coating materials are covered with a suitable adhesive. The substrate and coating need only be attached to one another in a manner that allows the adhesive to effectively form a bond between the substrate and coating. For example, the combination of substrate, adhesive, and coating can be run through a set of pinch rollers, they can be hand rolled, or even clamped together if desired.

Afterwards, the combination coating and substrate are subjected to standard thermoforming processes using either vacuum or pressure against the molds. A heat shield of some type is also preferred to avoid unnecessary heating of the coating material which is not to be thermoformed.

After the coating is thermoformed, the substrate and coating are cooled and the back of the coating material which has been thermoformed can optionally be reinforced with materials such as fiberglass reinforcing plastic or other suitable material.

In order to further illustrate the present invention and the advantages thereof, the following specific examples are given, it being understood that the same are intended only as illustrative and in no wise limitative.

EXAMPLES

It was desired to validate the above invention for a preferred embodiment such as the integrated sink/counter combination. A particle board substrate and Nuvel® surfacing material were selected as the appropriate test materials. A countertop of 4' by 2' by ¾" was selected and a particleboard substrate was cut to size. Next, a bowl shape for the sink was selected and a vacuum forming tool was fabricated to the appropriate size and shape. Since Nuvel® forms better with a tool which contracts the cosmetic surface, a male sink tool was selected.

After selecting the location for the sink along the 4' counter, a hole was cut in the particle board of the same shape as the sink vacuum forming mold and of the same size plus an additional ½" radius. This was performed by chamfering the top of the cut out with a suitable radius and then a ½" router bit was used around the entire sink opening.

Meanwhile, the Nuvel® sheet was dried in a hot air circulating oven overnight at a temperature of 180° F. An area on the back side of the Nuvel® sheet was masked off so that the laminating adhesive was kept off that area. The Nuvel® sheet was then laminated to the particle board with a solvent based contact cement. The adhesive in the combination Nuvel®/particle board was then allowed to dry.

The vacuum former and surrounding metal framework were preheated to minimize chill of the countertop. The countertop was placed on the vacuum box and mounted on the bottom side of the former (platten). The opening in the substrate was then lined up with the male mold mounted on the top side of the former. The clamp frames were activated and the countertop was mechanically held into position. A suitable heat shield was loosely located on the surface of the Nuvel® to avoid heating of the Nuvel® at locations other than the sink portion. A 0.060" aluminum sheet was found to be suitable for this purpose.

The shielded countertop assembly was then exposed to the thermo forming ovens. Although both top and bottom heaters were used originally used, the bottom heaters were turned off approximately 50% into the forming cycle. The Nuvel® was heated until is sagged noticeably (approximately 4"). Once the sheet reached its proper forming temperature the assembly was shuttled to the vacuum forming box where the heat shield was removed and the sink was then vacuum formed.

The integrated sink/counter combination was then removed from the thermoforming machine and allowed to cool. Once the combination was cool, the back of the Nuvel® sheet which had been thermoformed into the shape of a sink was sprayed with a fiberglass reinforced plastic backing.

What is claimed is:

1. A method for thermoforming a composite article of manufacture, comprising the steps of:

(A) adhering a sheet of thermoplastic material to a non-thermoplastic substrate to form a laminate wherein a first portion of the sheet is supported on the substrate and a second portion of the sheet is not supported on the substrate;

(B) aligning the second portion of the sheet with a mold for thermoforming the second portion of the sheet into a predetermined shape; and (C) thermoforming said second portion of the sheet to form the composite article, wherein the composite article comprises a continuous layer of the thermoplastic material, said layer having a first region wherein the layer is supported on said substrate and having a second region wherein the layer is not supported on the substrate and the layer exhibits the predetermined shape.

2. The method of claim 1, wherein said thermoplastic material comprises at least one polyalkylene terephthalate or polycyclohexyl-dimethylene terephthalate or mixture thereof.

3. The method of claim 1, wherein said thermoplastic material further comprises an inorganic filler.

4. The method of claim 3, wherein said inorganic filler comprises at least one filler selected from zinc oxide, barium sulfate, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins, glass microspheres, wollastonite, titanium dioxide, ground quartz, mica, cellulose fibers, or mixtures thereof.

5. The method of claim 4, wherein said filler comprises at least one filler selected from zinc oxide, barium sulfate, zirconium silicate, strontium sulfate, titanium dioxide, glass microspheres or mixtures thereof.

6. The method of claim 1, wherein said substrate material comprises a cellulosic based material.

7. The method of claim 6, wherein said cellulosic based material comprises at least one cellulosic based material selected from particleboard, fiberboard, chipboard or plywood.

8. The method of claim 1, wherein said predetermined shape is the shape of a sink.

9. The method of claim 1, further comprising the step of structurally reinforcing the second region of the layer subsequent to the step of thermoforming.

10. The method of claim 9, wherein said reinforcing step comprises applying a fiberglass reinforcing material to the underside of the second region of the layer.

11. The process of claim 8, wherein said method does not necessitate any secondary finishing operations prior to installation.

12. The thermoformed composite article of manufacture produced by the process of claim 1.

13. The thermoformed composite article of manufacture produced by the process of claim 8, wherein said thermoplastic material and said non-thermoplastic substrate comprise an integrated sink/counter assembly.

14. The thermoformed integrated sink/counter of claim 13, wherein said thermoplastic material further comprises a filler and wherein said substrate comprises particleboard, fiberboard, or plywood.

15. The thermoformed integrated sink/counter of claim 13, wherein said thermoplastic material and said non-thermoplastic substrate have thermal and/or moisture expansion properties which are at least 300% different from one another.

16. The method of claim 1, wherein said thermoplastic material comprises at least one resin selected from polycarbonate, polyetherimide, polyester, polyamide, polyester carbonates, polyphenylene sulfide, polyamideimide, polyarylate, polymethylpentene, polysulfone, polyethersulfone, polystyrene, rubber modified high impact polystyrene, acetyl, styrene acrylonitrile, styrene maleic anhydride, acrylonitrile styrene acrylate, modified polyphenylene ether, polyether ketone, acrylonitrile butadiene styrene, chlorinated polymer, fluorinated polymer, liquid crystal polymer, copolymers of the above, or blends of the above.

* * * * *